May 12, 1953
G. MENOSKY
2,638,191
PANEL MOUNTING ASSEMBLY
Filed March 13, 1950
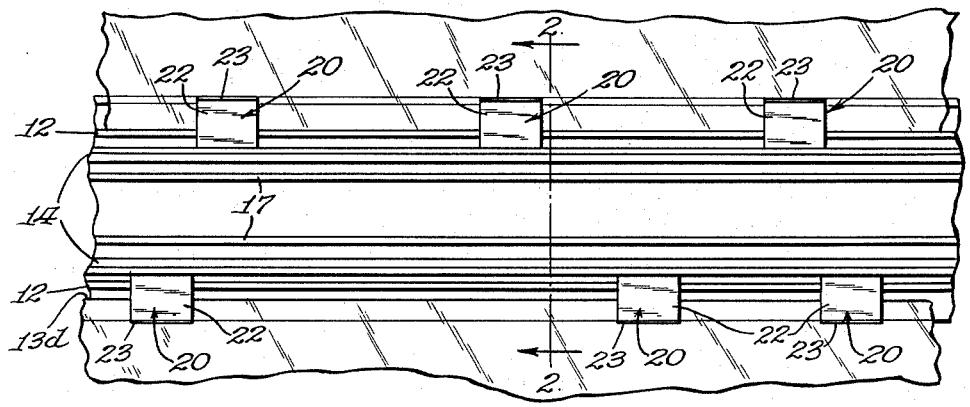
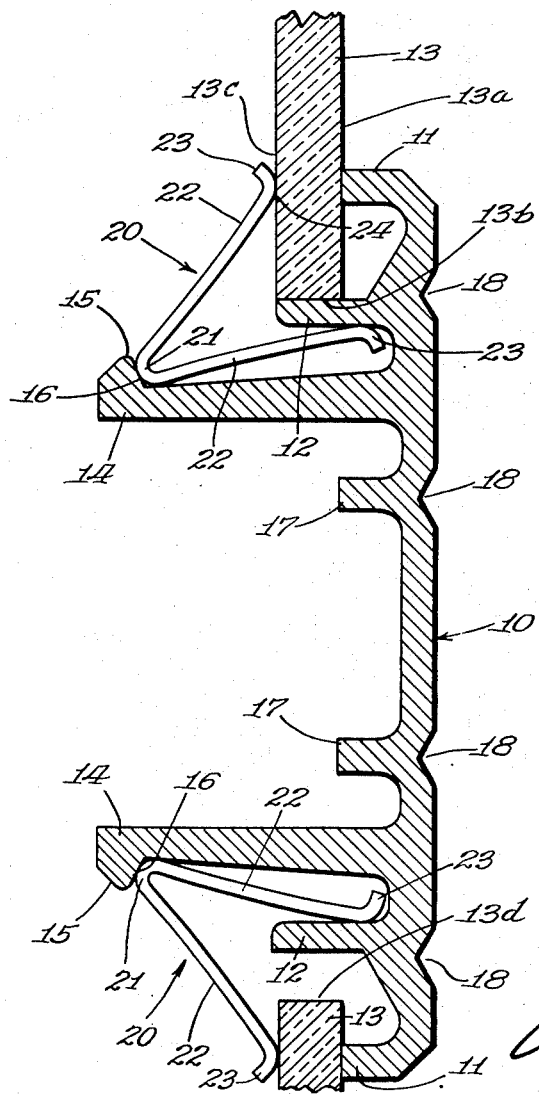
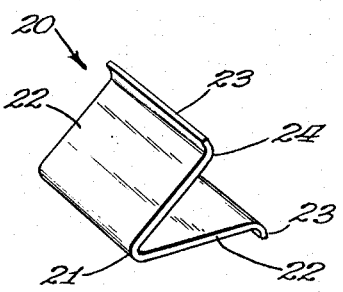
INVENTOR.
George Menosky
BY
Clarence J. Loftus Atty.

Patented May 12, 1953

2,638,191

UNITED STATES PATENT OFFICE 2,638,191

PANEL MOUNTING ASSEMBLY

George Menosky, Grand Rapids, Mich., assignor, by mesne assignments, to A M I Incorporated, a corporation of Delaware Application March 13, 1950, Serial No. 149,402

2 Claims. (Cl. 189—78)

This invention, in its broadest aspects, relates to a panel mounting assembly adapted to secure any type of thin panel within a marginal frame. More specifically, it relates to glass setting devices, since while the principles of the invention here disclosed are believed to be applicable to many and various constructions in which a thin sheet or panel is to be mounted in a marginal frame, the invention finds its greatest usefulness in connection with the mounting of glass or transparent plastic windows. The advantages of the present teachings are not, however, limited to mountings for conventional, flat, rectangular panes. They are equally applicable to irregular configurations, or three dimensional molded shapes such as are often employed to form portions of the housing of devices such as coin controlled machines, automatic phonographs, etc.

It is a primary object of the invention to provide mounting devices which are of unusual simplicity, yet afford a firm but resilient grip on the edges of the mounted panel. This involves a reconciliation of inherently conflicting requirements, since a firm grip is a prime requisite for adequate strength, yet the grip must be accomplished in a resilient manner so as to avoid cracking or chipping of a brittle glass pane, and to exhibit no tendency to mar or scratch the surface of a plastic sheet held by the mounting.

It is a further object of the invention to provide mounting devices which are entirely of metal, yet so designed that they not only avoid cracking or chipping of the brittle or fragile material of the pane, but will also permit considerable relative yielding of the parts, and will do so without allowing them to develop looseness. The accomplishment of this object is necessary to allow for expansion or contraction of the parts with respect to each other and accommodate a fairly wide variety of dimensional variations in the thickness of the panes as well as in the mountings thereof, but it is of even greater importance in providing a panel mounting which is tight and firm even after long use, and not apt to develop any objectionable rattle or "buzz" even when subjected to considerable vibration.

A further object of the invention is to provide an all metal mounting for glass or plastic panels, wherein the marginal edges of the panel are resiliently held to a solid metal rail by a firm but yieldable grip, which is accomplished without the need of putty, calking compounds, etc., and without the use of any screws or threaded clamping devices. This avoids any need of screws or screw holes, either in the rail or in the panel itself.

A further object of the invention is the provision of a mounting assembly including clamping devices adapted to secure the marginal edges of a panel to a longitudinal metal mounting rail which is of identical cross-sectional configuration throughout its length, so that the rail may be manufactured by the extruding process and will require no additional mechanical operations to suit it to its intended purpose. This is important in providing an assembly that is simple in construction and low in cost.

A further object is to provide, in combination, a metal mounting rail and a spring clip so designed that these parts coact to hold the marginal edge of a panel firmly yet resiliently to a supporting flange on the mounting rail, yet wherein the parts are so designed that the clips can be applied, removed or shifted without the necessity of employing special tools, and wherein the clips may be spaced uniformly from each other or at irregularly spaced intervals, depending upon the requirements of individual installations.

A still further object is to provide a mounting assembly including a rail and clips of the type indicated above, wherein the clips are of reversable, symmetrical form, so that they may be applied interchangeably in either of two positions. This avoids any possibility of improper functioning of the structures as a result of inadvertent, incorrect application of the clips.

The foregoing objects are accomplished according to this teaching by a simple mechanical arrangement of an extruded rail and self-retaining spring clips designed to coact therewith, the rail formed to include a flange against which the edge of the transparent panel is held by the spring clips.

The preferred embodiment of the invention is illustrated in the drawings herein, in which:

Figure 1 is an enlarged sectional view through a section of the panel mounting rail as here contemplated, showing the manner in which the rail, the panel and the retaining clips are held in self-retaining relationship with each other;

Figure 2 is a fragmental elevational view of a section of said rail and panel, showing the clips affixed at intervals spaced apart from each other. This view is taken from the left hand side of the structure seen in Figure 1, so that it shows the rear or "inside" appearance of the mounting; and Figure 3 is a perspective view of one of the spring clips contemplated by this invention.

The rail 10, as illustrated, is of double formation, having flanges 11 and 12 which are parallel to each other and each of which extends at right angles from the plane of the rail. The flanges 11 are adapted to bear against the front surface of the window pane or panel 13 (at a point spaced slightly inwardly from the extreme marginal edge of the panel), while the flanges 12 are positioned to extend across the marginal edge of the panel. Thus, the flanges 11 define the window aperture, while the flanges 12 provide an abutment or seat for the edges of the pane. It is contemplated that, in most instances at least, the panel 13 will be mounted in a frame extending entirely around it, so that the front face 13a of the panel will rest against the flanges 11 of a mounting rail adjacent all of the marginal edges of the panel. The edge of the panel may bear against the flange 12, as illustrated at 13b in the upper portion of Figure 1, or may be spaced therefrom as shown by the edge 13d in the lower portion of the figure. That is, in a mounting extending entirely around the panel, the panel need not necessarily contact the flange 12 at all points, and since the outside dimensions of the panel will normally be somewhat smaller than the aperture defined by these flanges of the rails, the panel will rest on the flange 12 only along its lower edges, with the edges 13d spaced from the flange at other points. This provides adequate mechanical clearance between the panel and its mounting, and allows for reasonable tolerances of manufacture.

In addition to the flanges 11 and 12, the rail 10 includes a pair of inwardly extending webs 14. These webs each have a ridge 15 along their rear edge to provide an angular abutment surface 16 spaced inwardly from the plane of the transparent panel 13 and outside of the marginal limits thereof, that is, beyond the edges 13b and 13d. The rail 10 may be provided with additional reinforcing ribs 17 and surface ornamentation such as the grooves 18, if desired, but these do not act as functional parts in the present disclosure.

The panel 13 is held in position solely by the V-shaped clips 20. These clips are snapped into position as shown, and may be spaced apart from each other as required (see Figure 2). The clips 20 each consist of a short strip of thin spring metal, folded at 21 so as to form two identical and opposite arms 22. These arms 22 lie in positions divergent from each other, and the ends of each of the arms are bent outwardly at 23 to provide smoothly rounded, convex pressure surfaces 24. Thus, these smoothly rounded surfaces are located at the points where the clips bear against the inside surface 13c of the glass or panel.

The clips 20 may be installed by inserting one of the rounded ends 23 under the flange 12 and flexing the two legs 22 outwardly from each other enough so that the fold 21 can be snapped over the ridge 15 and seated against the abutment surface 16. This may be done manually, simply by placing the clip in position with the fold 21 resting on the ridge or shoulder 15 and then forcing the clip forwardly toward the glass and outwardly toward the rail so that it snaps in place. A special tool may be employed to spread the legs 22 of the clip if desired, although this is unnecessary and it has been learned that even when the clips are formed of comparatively stiff steel springs, they may be easily snapped in position by pressing a screw driver blade or plier handle against the fold 21 to snap it over the shoulder 15.

From an examination of the drawings of the present disclosure it will be apparent that, with the parts in the position illustrated in Figure 1, the abutment 16 will serve as a means to limit rearward movement of the clips 20, while the flange 12 will hold the lower end portion 23 of the clip against inward movement, that is, movement toward the edges 13b or 13d of the panel. It follows that each clip will be held in the flexed position shown, in which the resilient nature of the metal will force the convex portion 24 of one of the arms of the clip against the inside face 13c of the panel. The clips contact the surface of the panel at a point spaced slightly inwardly from the edges, and opposite to the point of contact of the flanges 11, so that the panel is held in a firm grip at this point.

It will be clear, however, that notwithstanding firmness of this grip, the yieldable nature of the spring clips will not only provide the degree of resiliency required, but will also allow considerable tolerance as to the thickness of the panels and compensate for minor dimensional variations of the rails and of the clips themselves. Moreover, a mounting according to the present design will permit a fairly wide angular misalignment between the rail and the panel without exerting undue strains on either. It follows that while the panel is held securely and restrained against unwanted vibration, either the panel or the rail may be tilted considerably with respect to each other without danger of chipping or shattering the panel, even if it is of such brittle material as ordinary glass.

To remove the panel from the mounting it is necessary only to snap the clips out from behind the ridge 15. This may easily be done by inserting a screw driver blade in the V between the members 22 and prying the clip upwardly until the fold 21 snaps off of the surface 16.

From the foregoing, it will be apparent that by the present teachings an efficient and yet simple glass mounting device is provided. The mounting is advantageous in several respects. It is entirely of metal, yet is devoid of any screws, screw threads or special fittings. As a result, it is considerably cheaper to manufacture and easier to use than assemblies employing these devices. The rails employed may be exactly identical at all points along the cross-section, so that they man be manufactured by an economical extruding process without any additional punching, drilling, milling or other machine operations. The clips also are of a form well suited to economical methods of manufacture, and may be produced in large quantities by a simple punch press operation, employing a relatively inexpensive die.

With all of the above, the assembly affords a mounting sufficiently resilient so that it will hold securely even if the panel and rail are badly misaligned, and can be adjusted to give as firm or as loose a grip as desired merely by varying the spacing between the individual clips inserted in the channel. The clips may be easily inserted or removed without the need of special tools or unusual skills. It follows that the teachings of the present invention are not only desirable in the original assembly of a structure, but are also ideally suited to situations wherein it may be expected that changes, replacements or repair may be made by workmen not particularly skilled in glass setting arts.

Having thus described my invention, what I claim as new and desire to secure by United States Letters Patent is:

1. A panel mounting assembly for a panel of relatively thin sheet material having opposite inner and outer faces and a marginal edge thereon, comprising a metallic mounting strip having a right angle flange provided with a face supporting surface along its edge directly engaging the outer face of the panel adjacent its marginal edge, with an edge supporting flange extending rearwardly from said strip, said flanges being parallel to each other and providing a recess whereby to allow for tilting movements of said panel during installation, and when the same is in place and in engagement with said flanges, and a clip supporting web spaced from but parallel with the edge supporting flange and extending rearwardly beyond the end of said flange; said web having a ridge at its inner end forming an angular abutment rearwardly of the edge supporting flange; with a plurality of spring retaining clips carried on said web and bearing against the inner face of the panel to urge it into resilient engagement with the face supporting surface of the strip; said clips each consisting of a single integral V-shaped sheet metal spring strip having a center fold and two identical and opposite arms diverging from said fold at an acute angle to each other, with the center fold of the clip lying against the abutment of the clip supporting web and one of the arms underlying the edge supporting flange; the other arm of the clip resiliently engaging the inner face of the panel.

2. A panel mounting assembly for a panel of relatively thin sheet material having opposite faces and a marginal edge thereon, comprising a metallic mounting strip extending along at least one edge of the panel and having a pair of integral flanges each extending at a right angle to said strip and provided with faces, one of which being in direct engagement with the outer face of the panel adjacent the marginal edge thereof and the other face being in engagement with the marginal edge of the panel, said flanges being parallel to each other and providing a recess whereby to allow for tilting movements of said panel during installation, and when the same is in place and in engagement with said flanges, and a retaining clip consisting of a V-shaped sheet metal spring strip having a pair of angularly divergent arms, with the first of said arms extending outwardly beyond the inner face of the panel at its marginal edge, and the second of said arms engaging the inner face of the panel at a point opposite to said flange; the arms of said clip being tensioned toward each other so that they tend to spring together, with means for restraining the first of said arms against movement toward the panel to cause the second arm to urge the panel into firm but resilient engagement with said flange, and means for retaining said clip in position on the mounting strip.

GEORGE MENOSKY.

References Cited in the file of this patent
UNITED STATES PATENTS

| Number | Name | Date |
| --- | --- | --- |
| 985,800 | Hartbauer | Mar. 7, 1911 |
| 1,040,572 | Otterson | Oct. 8, 1912 |
| 2,363,429 | Lowry | Nov. 21, 1944 |
| 2,497,515 | Pearse | Feb. 14, 1950 |
| 2,505,553 | Krantz | Apr. 25, 1950 |